United States Patent
Yoo et al.

(10) Patent No.: US 12,469,853 B2
(45) Date of Patent: Nov. 11, 2025

(54) SACRIFICIAL POSITIVE ELECTRODE MATERIAL WITH REDUCED GAS GENERATION AND METHOD OF PREPARING THEREOF

(71) Applicant: LG Energy Solution, Ltd., Seoul (KR)

(72) Inventors: Tae Gu Yoo, Daejeon (KR); Wang Mo Jung, Daejeon (KR); Chi Ho Jo, Daejeon (KR); Ji Hye Kim, Daejeon (KR); Hae Jung Jung, Daejeon (KR); Jong Wook Heo, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 409 days.

(21) Appl. No.: 17/915,607

(22) PCT Filed: Feb. 9, 2022

(86) PCT No.: PCT/KR2022/001998
§ 371 (c)(1),
(2) Date: Sep. 29, 2022

(87) PCT Pub. No.: WO2022/182019
PCT Pub. Date: Sep. 1, 2022

(65) Prior Publication Data
US 2023/0128140 A1      Apr. 27, 2023

(30) Foreign Application Priority Data

Feb. 23, 2021    (KR) .................. 10-2021-0024248
Jan. 19, 2022    (KR) .................. 10-2022-0007852

(51) Int. Cl.
*H01M 4/62*          (2006.01)
*H01M 4/02*          (2006.01)

(52) U.S. Cl.
CPC ...... *H01M 4/628* (2013.01); *H01M 2004/028* (2013.01)

(58) Field of Classification Search
CPC ...... H01M 4/628; H01M 4/131; H01M 4/525; H01M 2004/028
See application file for complete search history.

(56) References Cited

U.S. PATENT DOCUMENTS

2013/0171524 A1    7/2013   Cho et al.
2015/0372304 A1   12/2015   Tasegawa et al.
(Continued)

FOREIGN PATENT DOCUMENTS

CN      111554919 A    *    8/2020   ......... C01G 49/0027
JP       10831455 A          2/1996
(Continued)

OTHER PUBLICATIONS

KR20050052266A translation (Year: 2005).*
(Continued)

*Primary Examiner* — Allison Bourke
*Assistant Examiner* — Travis L. Martin
(74) *Attorney, Agent, or Firm* — Lerner David LLP

(57) ABSTRACT

A disclosure sacrificial positive electrode material with reduced gas generation and a method of preparing the same are disclosed herein. In some embodiments, a method includes calcining a mixture of lithium oxide ($Li_2O$) and cobalt oxide (CoO) in an atmosphere containing an inert gas and oxygen gas and having a relative humidity of 20% or less, wherein the oxygen gas is at a partial pressure of 1% or less, to prepare a lithium cobalt metal oxide represented by Chemical Formula (1):

$$Li_xCo_{(1-y)}M_yO_{4-z}A_z \quad \text{[Chemical Formula 1]}$$

M is at least one selected from the group consisting of Ti, Al, Zn, Zr, Mn and Ni, A is a halogen, x, y and z are $5 \leq x \leq 7$, $0 \leq y \leq 0.4$, and $0 \leq z \leq 0.001$. A battery having the sacrificial positive electrode material can have reduced gas generation (Continued)

in the electrode assembly at the time of charging the battery, and thus the stability and life of the battery are improved.

5 Claims, 6 Drawing Sheets

(56) References Cited

U.S. PATENT DOCUMENTS

| | | | |
|---|---|---|---|
| 2018/0197691 A1 | 7/2018 | Song et al. | |
| 2018/0323430 A1 | 11/2018 | Son et al. | |
| 2020/0176754 A1 | 6/2020 | Lho et al. | |
| 2020/0365904 A1 | 11/2020 | Jeon et al. | |
| 2022/0013773 A1* | 1/2022 | Lee | C01G 53/42 |
| 2022/0181627 A1 | 6/2022 | Park et al. | |
| 2023/0395854 A1* | 12/2023 | Watanabe | C01G 49/0027 |

FOREIGN PATENT DOCUMENTS

| | | | |
|---|---|---|---|
| JP | 3786454 B2 | 6/2006 | |
| KR | 20050052266 A * | 6/2005 | |
| KR | 20130079109 A | 7/2013 | |
| KR | 20170003209 A | 1/2017 | |
| KR | 20180010423 A | 1/2018 | |
| KR | 20190059242 A | 5/2019 | |
| KR | 20190063408 A | 6/2019 | |
| KR | 20190078392 A | 7/2019 | |
| KR | 20190142100 A | 12/2019 | |
| KR | 20200066048 A | 6/2020 | |
| WO | WO-2014007360 A1 * | 1/2014 | C01G 53/50 |

OTHER PUBLICATIONS

WO2014007360A1 translation (Year: 2014).*
CN111554919A translation (Year: 2020).*
International Search Report for Application No. PCT/KR2022/001998 mailed May 31, 2022, pp. 1-3.
EESR for Application No. 22759937.0 dated Jun. 3, 2024. 10 pgs.

* cited by examiner

[FIG. 1]

[FIG. 3]
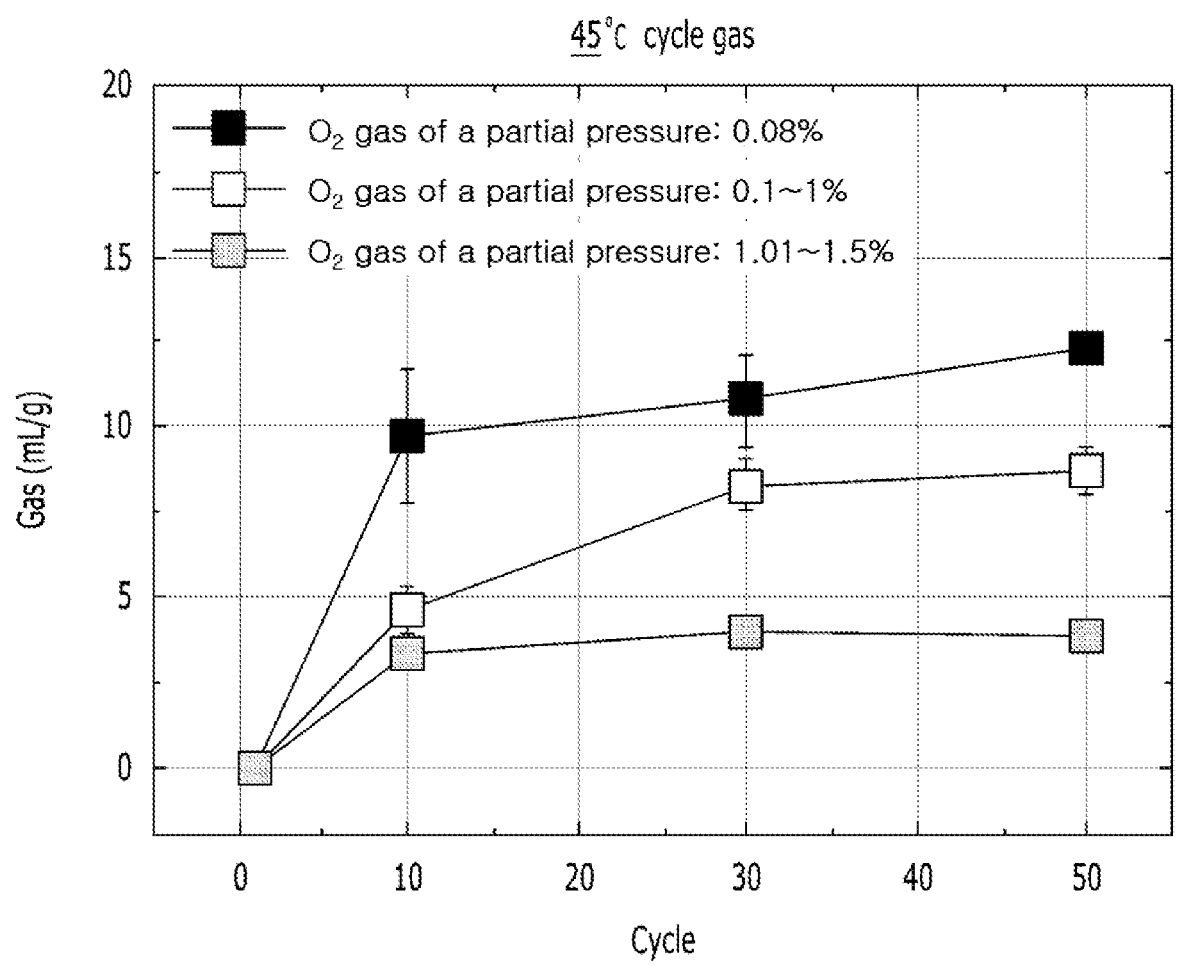

[FIG. 4]
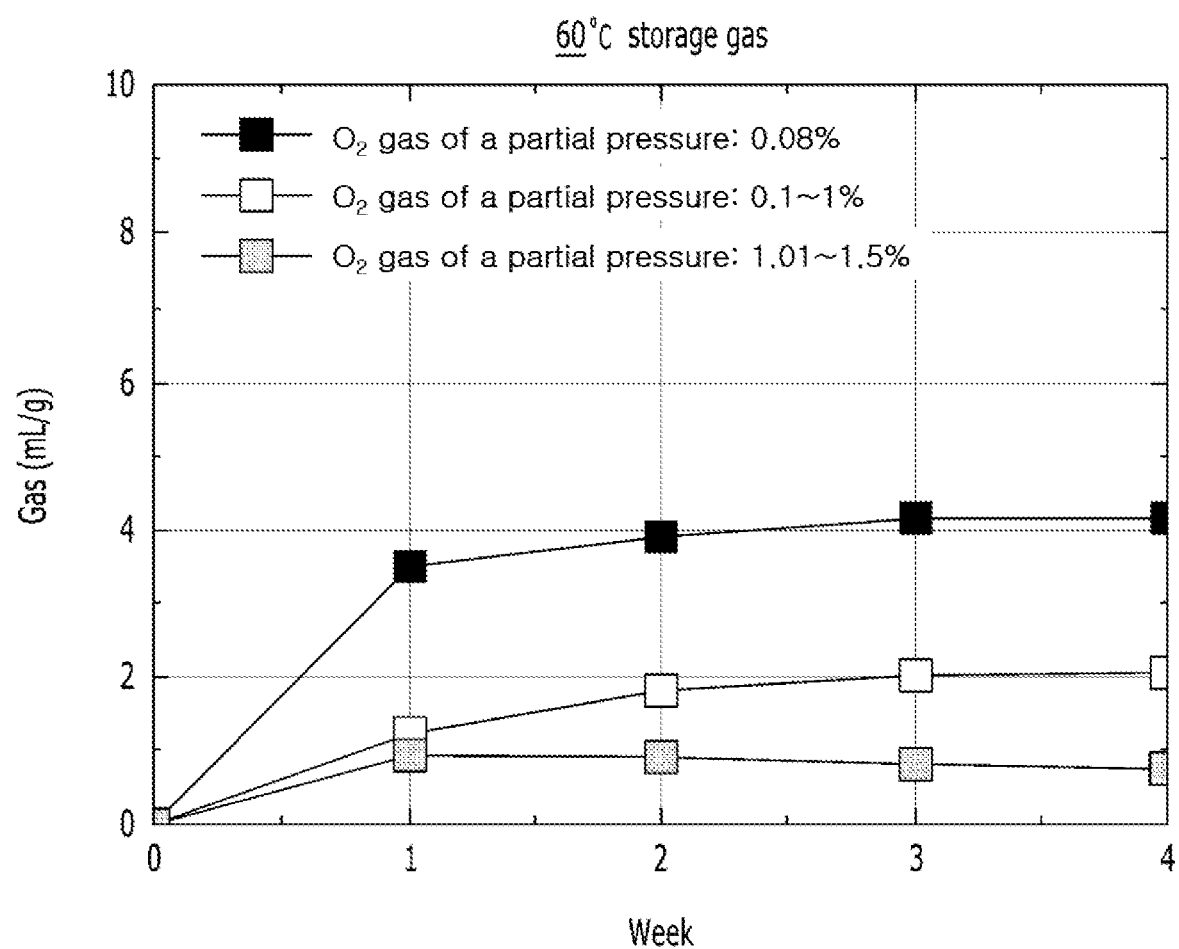

[FIG. 5]
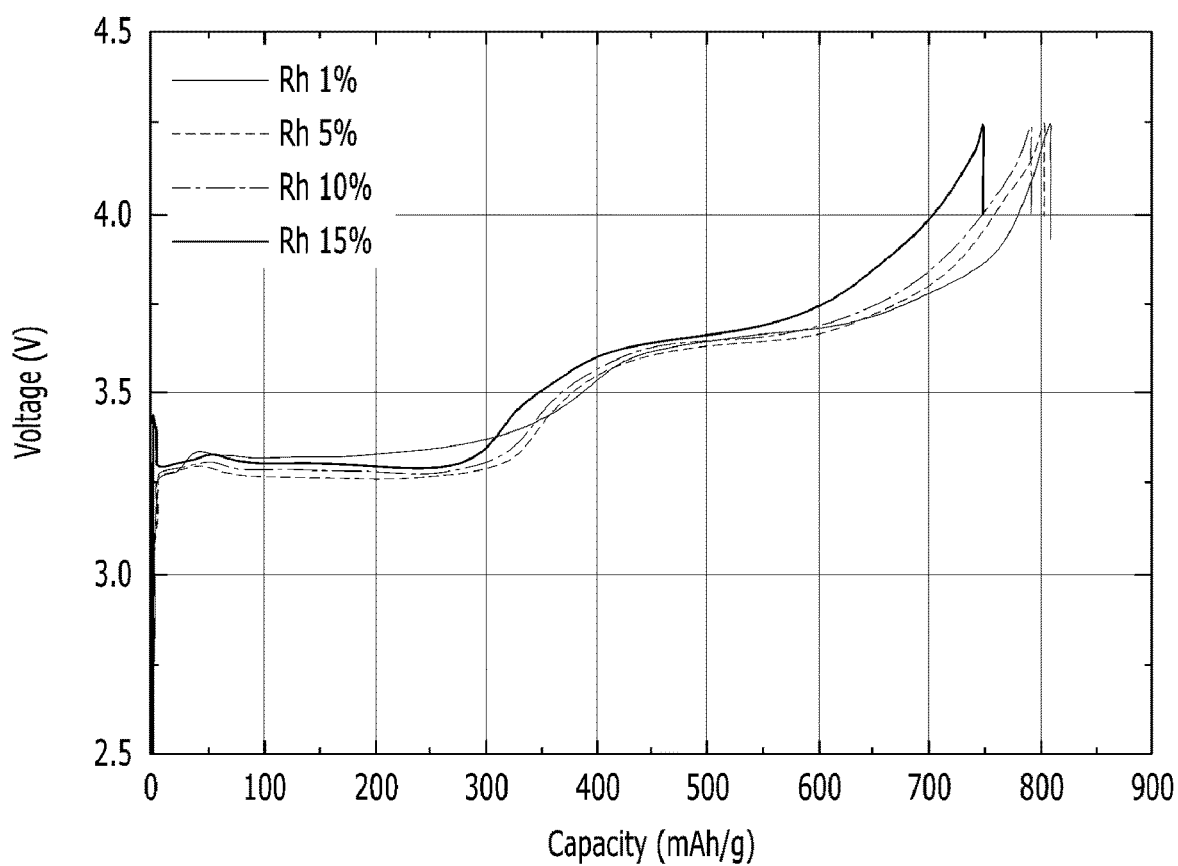

[FIG. 6]
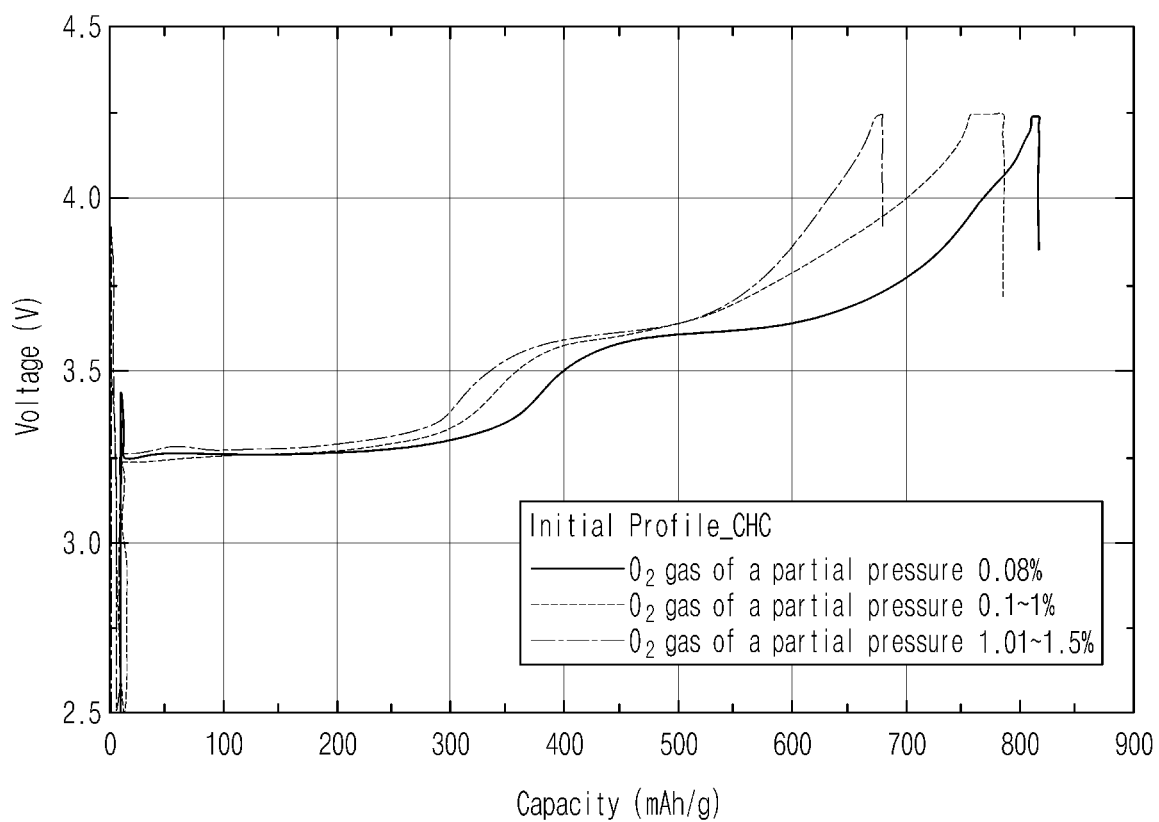

SACRIFICIAL POSITIVE ELECTRODE MATERIAL WITH REDUCED GAS GENERATION AND METHOD OF PREPARING THEREOF

CROSS-REFERENCE TO RELATED APPLICATIONS

The present application is a national phase entry under 35 U.S.C. § 371 of International Application No. PCT/KR2022/001998, filed on Feb. 9, 2022, which claims priority from Korean Patent Application No. 10-2021-0024248, filed Feb. 23, 2021, and Korean Patent Application No. 10-2022-0007852, filed Jan. 19, 2022, the contents of which are incorporated by reference herein.

TECHNICAL FIELD

The present disclosure relates to a method of preparing a sacrificial positive electrode material with reduced gas generation during charging of a battery by controlling both humidity and gas conditions in calcination of a raw material mixture, and a sacrificial positive electrode material prepared according to the method.

BACKGROUND ART

In recent years, as high-capacity electrode materials are more required, an irreversible additive is also required to have a higher irreversible capacity. However, it is true that there is a limit to the development of a positive electrode additive having such a high irreversible capacity.

Meanwhile, a conventional irreversible additive such as $Li_6CoO_4$ is generally prepared by reacting cobalt oxide, etc. with an excess of lithium oxide. At this time, by-products such as unreacted lithium oxide ($Li_2O$), which did not participate in the reaction, remain in the final prepared irreversible additive, which may cause oxidation in the charging/discharging process to generate oxygen gas inside the battery. Oxygen gas thus generated may cause volume expansion and the like, and may be one of the main factors leading to deterioration of battery performance.

In addition, the by-products such as lithium oxide may react with a binder component and the like when preparing a slurry composition for manufacturing an electrode, thereby increasing the viscosity or causing gelation of the composition. As a result, it is difficult to uniformly apply the electrode composition for forming the active material layer, and there is a problem in that the characteristics of the battery are deteriorated.

Therefore, due to the above problems, the development of a positive electrode additive having a higher irreversible capacity while the amount of oxygen generated in the charging/discharging process of the battery is small due to a small amount of residual by-products such as lithium oxide is continuously required.

RELATED ART LITERATURE

Republic of Korea Patent Publication No. 2019-0078392

DISCLOSURE

Technical Problem

Accordingly, an object of the present disclosure is to provide a positive electrode additive having a higher irreversible capacity while an amount of oxygen generated in the charging and discharging process of the battery is small due to a small residual amount of by-products such as lithium oxide, and a positive electrode and a lithium secondary battery including the same.

Technical Solution

In order to solve the above-described problems, in one embodiment, the present disclosure provides a method of preparing a sacrificial positive electrode material, wherein the method includes calcining a raw material mixture of lithium oxide ($Li_2O$) and cobalt oxide (CoO) under an atmosphere containing an inert gas and oxygen gas, wherein the oxygen gas is at a partial pressure of 1% or less to prepare a lithium cobalt metal oxide represented by the following Chemical Formula (1), the relative humidity (RH) during calcination is 20% or less:

$$Li_xCo_{(1-y)}M_yO_{4-z}A_z \qquad \text{[Chemical Formula 1]}$$

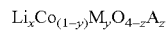

wherein,

M is at least one selected from the group consisting of Ti, Al, Zn, Zr, Mn and Ni, A is a halogen, x, y and z are 5≤x≤7, 0≤y≤0.4, and 0≤z≤0.001.

Here, the calcining may be carried out in an inert gas atmosphere having a relative humidity of 0.1% to 15% and including oxygen gas at a partial pressure of 0.1 to 1%.

In addition, the calcining temperature may be 500 to 800° C.

In addition, the raw material mixture of lithium oxide ($Li_2O$) and cobalt oxide (CoO) may be a mixture in which lithium oxide ($Li_2O$) and cobalt oxide (CoO) are mixed in a molar ratio of 2 to 4:1.

In addition, the lithium oxide ($Li_2O$) may have an average particle size (D50) of 10 μm to 30 μm.

In addition, the sacrificial positive electrode material prepared by the above preparation method may satisfy at least one of Equations 1 and 2 below, as measured by X-ray diffraction:

$$A/B \leq 0.1 \qquad \text{[Equation 1]}$$

$$C/D \leq 0.35 \qquad \text{[Equation 2]}$$

wherein,

A represents the intensity of the strongest peak among the peaks appearing in the range of 2θ=18.9±0.1°, B represents the intensity of the strongest peak among the peaks appearing in the range of 2θ=19.2±0.1°, C represents the intensity of the strongest peak among the peaks appearing in the range of 2θ=38.5±0.1°, and D represents the intensity of the strongest peak among the peaks appearing in the range of 2θ=47.9±0.1°.

The present disclosure also provides, in one embodiment, an electrode assembly including a positive electrode comprising:

a positive electrode current collector; and a positive electrode mixture layer including a positive electrode active material, a conductive material, an organic binder polymer, and a sacrificial positive electrode material on the positive electrode current collector;

the sacrificial positive electrode material includes lithium cobalt metal oxide represented by Chemical Formula 1 below, and satisfies at least one of Equations 1 and 2, as measured by X-ray diffraction:

$$Li_xCo_{(1-y)}M_yO_{4-z}A_z \quad \text{[Chemical Formula 1]}$$

wherein,
M is at least one selected from the group consisting of Ti, Al, Zn, Zr, Mn and Ni,
A is a halogen,
x, y and z are 5≤x≤7, 0≤y≤0.4, and 0≤z≤0.001, $$A/B \leq 0.1 \quad \text{[Equation 1]}$$

$$C/D \leq 0.35 \quad \text{[Equation 2]}$$

wherein,
A represents the intensity of the strongest peak among the peaks appearing in the range of 2θ=18.9±0.1°,
B represents the intensity of the strongest peak among the peaks appearing in the range of 2θ=19.2±0.1°,
C represents the intensity of the strongest peak among the peaks appearing in the range of 2θ=38.5±0.1°, and
D represents the intensity of the strongest peak among the peaks appearing in the range of 2θ=47.9±0.1°.

Here, the positive electrode active material may be a lithium composite transition metal oxide containing two or more elements selected from the group consisting of nickel (Ni), cobalt (Co), manganese (Mn), aluminum (Al), zinc (Zn), titanium (Ti), magnesium (Mg), chromium (Cr) and zirconium (Zr).

In addition, the content of the sacrificial positive electrode material may be 0.001 to 5.0 parts by weight based on 100 parts by weight of the positive electrode active material.

Furthermore, in one embodiment, the present disclosure provides a lithium secondary battery including the electrode assembly.

Advantageous Effects

In the method of preparing the sacrificial positive electrode material according to the present disclosure, the calcination of the raw material mixture is carried out under an atmosphere containing an inert gas and a small amount of oxygen ($O_2$) gas and a humidity satisfying a specific range, whereby the generation of gas, particularly oxygen ($O_2$) gas, generated in the electrode assembly at the time of charging the battery can be reduced, and thus the effect of improving the stability and life of the battery containing the same is excellent.

BRIEF DESCRIPTION OF THE DRAWINGS

FIG. 3 is a graph showing the amount of gas generated according to the number of times of charging/discharging at 45° C. for each oxygen partial pressure in calcination of the raw material mixture.

FIG. 4 is a graph showing the amount of gas generated according to the storage time (units: week) at 60° C. for each oxygen partial pressure in calcination of the raw material mixture.

FIG. 5 is a graph showing an initial charging/discharging curve of a positive electrode including a sacrificial positive electrode material according to a humidity condition in calcination of a raw material mixture.

FIG. 6 is a graph showing an initial charging/discharging curve of a positive electrode including a sacrificial positive electrode material according to an oxygen partial pressure in calcination of a raw material mixture.

DETAILED DESCRIPTION OF THE PREFERRED EMBODIMENTS

Figure 1:
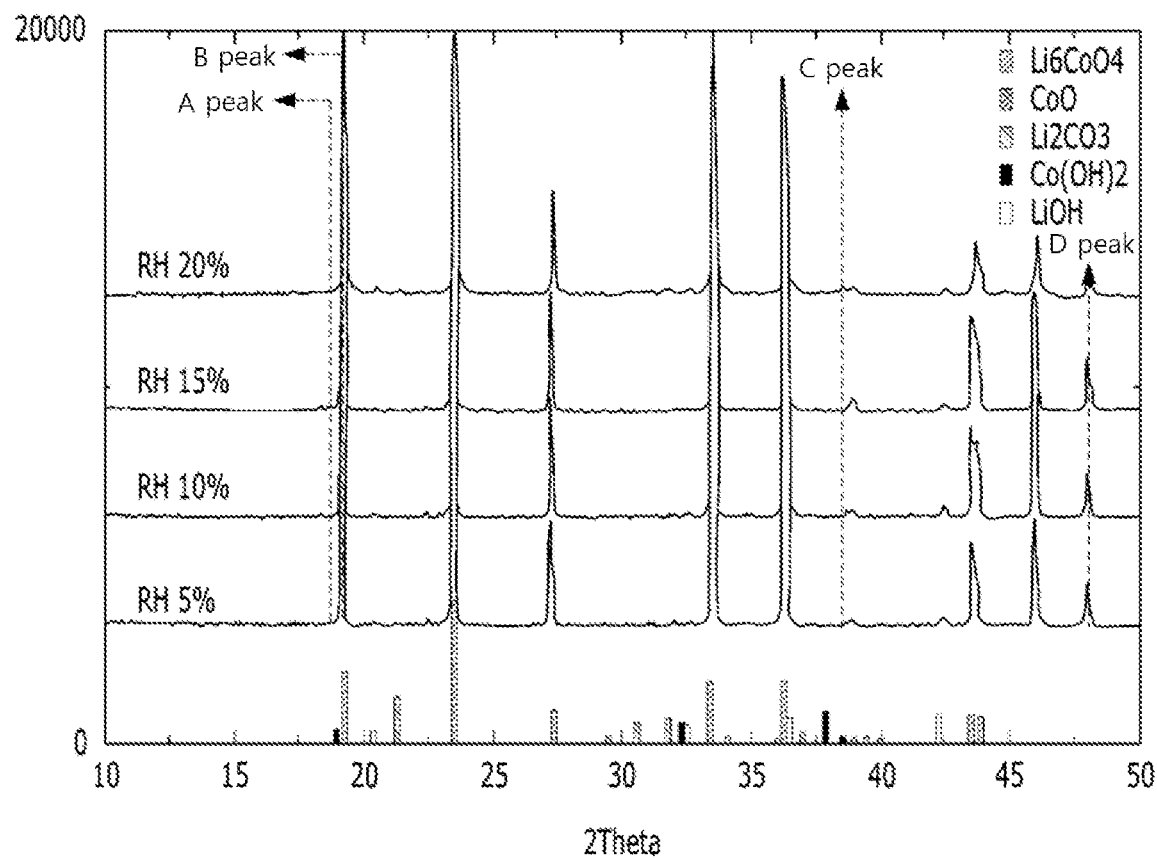
FIG. 1 is a graph showing X-ray diffraction of a sacrificial positive electrode material according to a humidity condition in calcination of a raw material mixture.

Since the present disclosure can have various changes and can have various embodiments, specific embodiments will be described in detail in the detailed description.

However, this is not intended to limit the present disclosure to specific embodiments, and it should be understood to include all modifications, equivalents and substitutes included in the spirit and scope of the present disclosure.

In the present disclosure, it is to be understood that the terms "include(s)" or "have(has)" and the like are intended to specify the presence of stated features, numbers, steps, operations, components, components or combinations thereof, but do not preclude the presence or addition of one or more other features or numbers, steps, operations, components and combinations thereof.

Further, in the present disclosure, when a portion of a layer, film, region, plate, etc. is described as being "on" another portion, it includes not only the case where the other portion is "directly on" but also the case where there is another portion therebetween. Conversely, where a portion of a layer, film, region, plate, etc. is described as being "under" another portion, this includes the case where there is another portion therebetween as well as "directly under" the other portion. Also, herein, what is referred to as being disposed "on" may include being disposed not only on an upper part but also on a lower part.

In addition, in the present disclosure, "relative humidity (RH)" is expressed as a percentage (%) and is the ratio of the amount of water vapor currently contained in the air to the maximum saturated water vapor pressure that a constant volume of air can hold, and it may be expressed as a percentage of the humidity inside the electric furnace in which the raw material mixture is calcined.

In addition, in the present disclosure, "$D_{50}$" is the particle size of the point that reaches 50% of the volume percentage in the cumulative curve when calculating the cumulative curve of the particle size distribution with the total volume being 100%, and it means the particle size where the volume is 50% by accumulating from the smallest particle size. The average particle size (D50) can be measured, for example, by using a laser diffraction method, and the laser diffraction method can generally measure a particle size of from a submicron region to several mm, and high reproducibility and high resolution results can be obtained.

Hereinafter, the present disclosure will be described in more detail.

Method of Preparing a Sacrificial Positive Electrode Material

In one embodiment, the present disclosure provides a method of preparing a sacrificial positive electrode material, wherein the method includes calcining a raw material mixture of lithium oxide ($Li_2O$) and cobalt oxide (CoO) under an atmosphere containing inert gas and oxygen gas, wherein the oxygen gas is at a partial pressure of 1% or less to prepare a lithium cobalt metal oxide represented by the following Chemical Formula (1), $$Li_xCo_{(1-y)}M_yO_{4-z}A_z \quad \text{[Chemical Formula 1]}$$

wherein,
M is at least one selected from the group consisting of Ti, Al, Zn, Zr, Mn and Ni,
A is a halogen,
x, y and z are 5≤x≤7, 0≤y≤0.4, and 0≤z≤0.001.

The method of preparing a sacrificial positive electrode material according to the present disclosure relates to a method of preparing a lithium cobalt metal oxide represented by Chemical Formula 1 as a sacrificial positive electrode material, wherein the lithium cobalt metal oxide represented by Chemical Formula 1 has an anti-fluorite structure $Li_xCoO_{4-z}A_z$ (provided that A is F or Cl, 5.4≤x≤6.8 and 0≤z≤0.0005), and in some cases, any one or more of Ti, Al, Zn, Zr, Mn and Ni may doped at the cobalt (Co) position of $Li_xCoO_{4-z}A_z$. Specifically, the lithium cobalt metal oxide may include at least one selected from the group consisting of $Li_6CoO_4$, $Li_6Co_{(1-y)}Ti_yO_4$, $Li_6Co_{(1-y)}Al_yO_4$, $Li_6Co_{(1-y)}Zn_yO_4$, $Li_6Co_{(1-y)}Zr_yO_4$, $Li_6Co_{(1-y)}Mn_yO_4$, $Li_6Co_{(1-y)}Ni_yO_4$ (provided that 0≤y≤0.4) and mixtures thereof.

The sacrificial positive electrode material including this lithium cobalt metal oxide may be prepared by calcining a raw material mixture of lithium oxide ($Li_2O$) and cobalt oxide (CoO) mixed in a molar ratio of 2 to 4:1, for example 2.5 to 3.5:1, or 2.95 to 3.1:1, and when one or more oxides of Ti, Al, Zn, Zr, Mn and Ni are added to the raw material mixture, a lithium cobalt metal oxide doped with one or more of Ti, Al, Zn, Zr, Mn and Ni may be prepared.

Here, the temperature at which the calcining is carried out is not particularly limited and may be applied as long as the mixed metal oxides can be transformed into the lithium cobalt metal oxide represented by Chemical Formula 1. Specifically, the calcining temperature may be 500 to 800° C., more specifically 500 to 700° C.; 600 to 800° C.; 600 to 750° C.; 650 to 800° C.; 630 to 770° C.; or 660 to 740° C.

In addition, the calcination may be carried out under an atmosphere containing an inert gas and a small amount of oxygen gas, for example, an atmosphere containing an argon (Ar) gas or nitrogen ($N_2$) gas and oxygen gas, wherein the oxygen gas is at a partial pressure of 1% or less; 0.1 to 1%; 0.5 to 1%; 0.2 to 0.8%; 0.5 to 0.9%; or 0.2 to 0.6%.

In the present disclosure, by controlling the content of the oxygen gas contained in the inert gas during calcination of a raw material mixture to the above-mentioned range, it is possible to prevent an increase in the amount of gas generated during charging and discharging of the battery because partial pressure of oxygen gas is too low, and it is possible to prevent the initial charging capacity of the batteries from being lowered due to excess oxygen gas.

In addition, the humidity during calcination may be a relative humidity (RH) of 20% or less, specifically, 0.1% to 20%; 0.1% to 18%; 0.1% to 15%; 1% to 15%; 0.5% to 12%; 1% to 12%; 4% to 12%; 7% to 12%; 0.5% to 10%; 0.5% to 7%; or 3% to 8%.

The present disclosure can prevent the fraction of the lithium cobalt metal oxide represented by Chemical Formula 1 included in the prepared sacrificial positive electrode material from being lowered due to the remarkably low humidity of less than 0.01% by controlling the humidity in the calcining of the raw material mixture to such a range, and can overcome the problem that the initial charging capacity of the battery is reduced due to excess humidity.

As an example, in the method of preparing a sacrificial positive electrode material according to the present disclosure, calcining may be carried out under a relative humidity (RH) of 4-6%; and an atmosphere containing argon (Ar) gas or nitrogen ($N_2$) gas atmosphere and oxygen gas, wherein the oxygen gas is at a partial pressure 0.2 to 0.8%, at a temperature of 670 to 730° C. for 2 to 20 hours.

Conventionally, a sacrificial positive electrode material including lithium cobalt metal oxide represented by Chemical Formula 1 has an anti-fluorite structure by a calcining process, and the sacrificial positive electrode material having the anti-fluorite structure has a problem of generating a large amount of gas containing oxygen ($O_2$), carbon monoxide (CO), carbon dioxide ($CO_2$), hydrogen ($H_2$), etc. during charging/discharging.

However, the sacrificial positive electrode material prepared according to the present disclosure may prevent the highly reactive lithium oxide ($Li_2O$) from remaining by calcining a raw material mixture containing lithium oxide ($Li_2O$) and cobalt oxide (CoO) under a condition of mixing a small amount of oxygen gas with an inert gas and a relative humidity (RH) satisfying the above-mentioned range, so it is possible to increase the fraction of lithium cobalt metal oxide represented by Chemical Formula 1 in the synthesized sacrificial positive electrode material, and further reduce the amount of gas generated at the time of using the battery while maintaining or increasing the charge/discharge capacity of the battery.

As an example, in the sacrificial positive electrode material prepared according to the present disclosure, the fraction of lithium cobalt metal oxide represented by Chemical Formula 1 increases, so that at least one of Equations 1 and 2 below may be satisfied when X-ray diffraction measurement is performed:

$$A/B \leq 0.1 \quad \text{[Equation 1]}$$

$$C/D \leq 0.35 \quad \text{[Equation 2]}$$

wherein,
A represents the intensity of the strongest peak among the peaks appearing in the range of 2θ=18.9±0.1°,
B represents the intensity of the strongest peak among the peaks appearing in the range of 2θ=19.2±0.1°,
C represents the intensity of the strongest peak among the peaks appearing in the range of 2θ=38.5±0.1°, and
D represents the intensity of the strongest peak among the peaks appearing in the range of 2θ=47.9±0.1°.

In Equations 1 and 2, the peaks (B and D) appearing in the ranges of 2θ=19.2±0.1° and 47.9±0.1° are realized by the crystal of lithium cobalt metal oxide represented by Chemical Formula 1, and the peaks (A and C) appearing in the ranges of 2θ=18.9±0.1° and 2θ=38.5±0.1° are realized by impurities. The lower the intensity ratio of these peaks, i.e., "A/B" and "C/D", means that the fraction of lithium cobalt metal oxide represented by Chemical Formula 1 is high. In the sacrificial positive electrode material prepared according to the present disclosure, the fraction of lithium cobalt metal oxide represented by Chemical Formula 1 is improved to 98% or more, and thus A/B may be satisfied by 0.15 or less, specifically 0.12 or less, 0.1 or less, or 0.05 or less in X-ray diffraction measurement; and C/D may be satisfied by 0.3 or less, 0.25 or less, or 0.1 or less. In some cases, A/B and C/D may be satisfied by 0 when the lithium cobalt metal oxide represented by Chemical Formula 1 accounts for 100% of the sacrificial positive electrode.

According to the method of preparing a sacrificial positive electrode material according to the present disclosure, the raw material mixture is calcining under an inert gas atmosphere including an inert gas and a small amount of oxygen ($O_2$) gas and a relative humidity (RH) that satisfies a specific range, whereby the generation of gas, particularly oxygen ($O_2$) gas, generated in the electrode assembly at the time of charging the battery can be reduced, and thus the effect of improving the stability and life of the battery containing the same is excellent.

Positive Electrode

In one embodiment, the present disclosure provides a positive electrode including:

a positive electrode current collector; and a positive electrode mixture layer containing a positive electrode active material, a conductive material, an organic binder polymer, and a sacrificial positive electrode material on the positive electrode current collector;

the sacrificial positive electrode material is prepared according to the preparation method, includes a lithium cobalt metal oxide represented by Chemical Formula 1 below, and satisfies at least one of Equations 1 and 2, as measured in X-ray diffraction analysis:

$$Li_xCo_{(1-y)}M_yO_{4-z}A_z \qquad \text{[Chemical Formula 1]}$$

wherein,

M is at least one selected from the group consisting of Ti, Mg, Al, Zn, Zr, Mn and Ni, A is a halogen, x, y and z are $5 \leq x \leq 7$, $0 \leq y \leq 0.4$, and $0 \leq z \leq 0.001$, $$A/B \leq 0.1 \qquad \text{[Equation 1]}$$

$$C/D \leq 0.35 \qquad \text{[Equation 2]}$$

wherein,

A represents the intensity of the strongest peak among the peaks appearing in the range of $2\theta=18.9\pm0.1°$, B represents the intensity of the strongest peak among the peaks appearing in the range of $2\theta=19.2\pm0.1°$, C represents the intensity of the strongest peak among the peaks appearing in the range of $2\theta=38.5\pm0.1°$, and D represents the intensity of the strongest peak among the peaks appearing in the range of $2\theta=47.9\pm0.1°$.

The positive electrode according to the present disclosure has a structure in which a positive electrode mixture layer is formed on a positive electrode current collector, wherein the positive electrode mixture layer includes a sacrificial positive electrode material prepared according to the preparation method of the present disclosure and containing lithium cobalt metal oxide represented by Chemical Formula 1 together with a positive electrode active material; conductive material; and the organic binder polymer, and thus the effect of reducing gas, particularly oxygen ($O_2$) gas, generated during charging/discharging of the battery is excellent.

Here, the positive electrode active material may be a lithium composite transition metal oxide containing two or more elements selected from the group consisting of nickel (Ni), cobalt (Co), manganese (Mn), aluminum (Al), zinc (Zn), titanium (Ti), magnesium (Mg), chromium (Cr) and zirconium (Zr). For example, the positive electrode active material may include a layered compound such as lithium cobalt oxide ($LiCoO_2$) and lithium nickel oxide ($LiNiO_2$), or a layered compound substituted with one or more transition metals; lithium manganese oxides of the formula $Li_{1+x}Mn_{2-x}O_4$ (wherein x is 0 to 0.33), $LiMnO_3$, $LiMn_2O_3$, $LiMnO_2$, etc.; lithium copper oxides such as $Li_2CuO_2$; vanadium oxides such as $LiV_3O_8$, $LiFe_3O_4$, $V_2O_5$, $Cu_2V_2O_7$; Ni site-type lithium nickel oxide represented by the formula $LiNi_{1-x}M_xO_2$ (wherein M=Co, Mn, Al, Cu, Fe, Mg, B or Ga, and x=0.01 to 0.3); lithium manganese composite oxide represented by the formula $LiMn_{2-x}M_xO_2$ (where M=Co, Ni, Fe, Cr, Zn or Ta, and x=0.01 to 0.1) or $Li_2Mn_3MO_8$ (where M=Fe, Co, Ni, Cu or Zn); lithium manganese composite oxide having a spinel structure represented by $LiNi_xMn_{2-x}O_4$; $LiMn_2O_4$ in which a part of Li in the formula is substituted with an alkaline earth metal ion; disulfide compounds; $Fe_2(MoO_4)_3$ etc.

In addition, the positive electrode mixture layer may include 0.001 to 5.0 parts by weight of the sacrificial positive electrode material prepared by the preparation method according to the present disclosure based on 100 parts by weight of the positive electrode active material. More specifically, the sacrificial positive electrode material may be included in an amount of 0.001 to 4.0 parts by weight; 0.001 to 3.0 parts by weight; 0.001 to 2.0 parts by weight; 0.001 to 1.0 parts by weight; 0.01 to 2.0 parts by weight; 0.05 to 2.0 parts by weight; 0.1 to 2.0 parts by weight; or 0.1 to 1.5 parts by weight, based on 100 parts by weight of the positive electrode active material.

In addition, the conductive material may be included in an amount of 1 to 20 parts by weight, specifically, 1 to 10 parts by weight; 1 to 5 parts by weight; 3 to 8 parts by weight; or 2 to 5 parts by weight, based on 100 parts by weight of the positive electrode active material.

In addition, the conductive material is not particularly limited as long as it has conductivity without causing a chemical change in the battery. For example, graphite such as natural graphite or artificial graphite; carbon black such as acetylene black, Ketjen black, channel black, furnace black, lamp black, and thermal black; conductive fibers such as carbon fibers and metal fibers; metal powders such as carbon fluoride, aluminum, and nickel powder; conductive whiskers such as zinc oxide and potassium titanate; conductive metal oxides such as titanium oxide; and conductive materials such as polyphenylene derivatives may be used.

In addition, the organic binder polymer is a component that assists in bonding of the active material and the conductive material and bonding to the current collector, and it may be included in an amount of 1 to 20 parts by weight, specifically, 1 to 10 parts by weight; 1 to 5 parts by weight; 3 to 8 parts by weight; or 2 to 5 parts by weight, based on 100 parts by weight of the positive electrode active material.

In addition, examples of the organic binder polymer include polyvinylidene fluoride (PVdF), polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diether polymer (EPDM), a sulfonated EPDM, styrene-butyrene rubber, fluororubber, various copolymers, etc.

In addition, the positive electrode may further include a filler for suppressing the expansion of the positive electrode in addition to the positive electrode active material, the conductive material, and the organic binder polymer in the positive electrode mixture layer, and the filler is not particularly limited when it is fibrous material that does not cause a chemical change in the battery. Specifically, as the filler, an olefin-based polymer such as polyethylene or polypropylene; a fibrous material such as glass fiber or carbon fiber may be used.

In addition, the positive electrode current collector is not particularly limited as long as it has high conductivity without causing a chemical change in the battery, and for example, stainless steel, aluminum, nickel, titanium, calcined carbon, etc. may be used, and in the case of aluminum or stainless steel, a surface treated with carbon, nickel, titanium, silver, etc. may be used. In addition, fine irregularities may be formed on the surface of the positive electrode current collector to increase the adhesion of the positive electrode active material, and various forms such as a film, a sheet, a foil, a net, a porous body, a foam, and a nonwoven body are possible. In addition, the average thickness of the positive electrode current collector may be appropriately applied in a range of 3 to 500 μm in consideration of the conductivity and total thickness of the positive electrode to be manufactured.

Electrode Assembly

Also, in one embodiment, the present disclosure provides an electrode assembly including the above-described positive electrode.

The electrode assembly according to the present disclosure may have a structure including the above-described positive electrode, a negative electrode, and a separation membrane interposed between the positive electrode and the negative electrode, and in some cases, the separation membrane may be excluded.

Here, the negative electrode is manufactured by coating, drying and pressing a negative electrode active material on the negative electrode current collector, and if necessary, the conductive material, organic binder polymer, filler, etc. as described above may be optionally further included.

In addition, as the negative electrode active material, for example, graphite having a completely layered crystal structure such as natural graphite, and soft carbon having a low crystallinity layered crystal structure (graphene structure; a structure in which hexagonal honeycomb planes of carbon are arranged in layers) and graphite materials such as hard carbon, artificial graphite, expanded graphite, carbon fiber, non-graphitizable carbon, carbon black, carbon nanotubes, fullerenes, activated carbon, etc. in which carbon and these structures are mixed with amorphous parts; $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me', Al, B, P, Si, Group 1 of the periodic table, metal complex oxides such as Group 2 and Group 3 elements and halogens; $0 \leq x \leq 1$; $1 \leq y \leq 3$; $1 \leq z \leq 8$); lithium metal; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$; conductive polymers such as polyacetylene; Li—Co—Ni-based materials; titanium oxide; lithium titanium oxide and the like, may be used.

In addition, the negative electrode current collector is not particularly limited as long as it has high conductivity without causing a chemical change in the battery, and for example, copper, stainless steel, nickel, titanium, calcined carbon, etc. may be used, and in the case of copper or stainless steel, a surface treated with carbon, nickel, titanium, silver, etc. may be used. In addition, like the positive electrode current collector, fine irregularities may be formed on the surface of the negative electrode current collector to strengthen the adhesion with the negative electrode active material, and various forms such as films, sheets, foils, nets, porous materials, foams, non-woven materials, etc. are possible. In addition, the average thickness of the negative electrode current collector may be appropriately applied in a range of 3 to 500 μm in consideration of the conductivity and total thickness of the negative electrode to be manufactured.

In addition, the separation membrane is interposed between the negative electrode and the positive electrode, and an insulating thin film having high ion permeability and mechanical strength is used. The separation membrane is not particularly limited as long as it is conventionally used in the art, but specifically, a sheet or nonwoven fabric made of chemical resistant and hydrophobic polypropylene, glass fiber, polyethylene or the like may be used, and in some cases, a composite separation membrane in which inorganic particles/organic particles are coated with an organic binder polymer on a porous polymer substrate such as a sheet or nonwoven fabric may be used. When a solid electrolyte such as a polymer is used as the electrolyte, the solid electrolyte may also serve as a separation membrane. In addition, the separation membrane may have an average pore diameter of 0.01 to 10 μm, and an average thickness of 5 to 300 μm.

Meanwhile, the electrode assembly may be wound in the form of a jelly roll and stored in a cylindrical battery, a prismatic battery, or a pouch-type battery, or may be stored in a pouch-type battery in a folding or stack-and-folding form, but is not limited thereto.

Lithium Secondary Battery

Furthermore, in one embodiment, the present disclosure provides a lithium secondary battery including the above-mentioned electrode assembly.

The lithium secondary battery according to the present disclosure may have a structure in which the electrode assembly is impregnated with a lithium salt-containing electrolyte.

In this case, the lithium salt-containing electrolyte may consist of an electrolyte and a lithium salt, and as the electrolyte, a non-aqueous organic solvent, an organic solid electrolyte, an inorganic solid electrolyte, and the like may be used.

As the non-aqueous organic solvent, for example, an aprotic organic solvent such as N-methyl-2-pyrrolidinone, ethylene carbonate, propylene carbonate, butylene carbonate, dimethyl carbonate, diethyl carbonate, gamma-butyrolactone, 1,2-dimethoxyethane, tetrahydroxy franc, 2-methyl tetrahydrofuran, dimethyl sulfoxide, 1,3-dioxolane, formamide, dimethylformamide, dioxolane, acetonitrile, nitromethane, methyl formate, methyl acetate, phosphoric acid triester, trimethoxymethane, dioxolane derivatives, sulfolane, methyl sulfolane, 1,3-dimethyl-2-imidazolidinone, propylene carbonate derivatives, tetrahydrofuran derivatives, ether, propionic methyl or propionic ethyl, may be used.

As the organic solid electrolyte, for example, polyethylene derivatives, polyethylene oxide derivatives, polypropylene oxide derivatives, phosphoric acid ester polymers, poly agitation lysine, polyester sulfide, polyvinyl alcohol, polyvinylidene fluoride, a polymeric material including an ionic dissociating group and the like may be used.

As the inorganic solid electrolyte, nitrides, halides, sulfates, etc. of Li, such as $Li_3N$, LiI, $Li_5Ni_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$, may be used.

The lithium salt is a material easily soluble in the non-aqueous electrolyte, and for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lithium lower aliphatic carboxylates, lithium 4-phenylboronate, imide and the like may be used.

In addition, for the purpose of improving charging/discharging characteristics, flame retardancy, etc., for example, pyridine, triethylphosphite, triethanolamine, cyclic ether, ethylene diamine, n-glyme, hexaphosphate triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxyethanol, aluminum trichloride and the like may be added to the electrolyte. In some cases, in order to impart incombustibility, a halogen-containing solvent such as carbon tetrachloride and ethylene trifluoride may be further included, and carbon dioxide gas may be further included to improve high temperature storage characteristics, and fluoro-ethylene carbonate (FEC), propene sultone (PRS), etc. may be further included.

Further, in one embodiment, the present disclosure provides a battery module including the above-described secondary battery as a unit cell, and provides a battery pack including the battery module.

The battery pack may be used as a power source for a medium or large device that requires high temperature stability, long cycle characteristics, and high rate characteristics, and specific examples of the medium or large device include a power tool that is powered by an omnipresent motor; electric vehicles including electric vehicles (EVs), hybrid electric vehicles (HEVs), plug-in hybrid electric vehicles (PHEVs), and the like; electric two-wheeled vehicles including electric bicycles (E-bikes) and electric scooters (E-scooter); electric golf carts; and a system for storing power, and more specifically, a hybrid electric vehicle (HEV), but is not limited thereto.

Hereinafter, the present disclosure will be described in detail by way of Examples.

However, the following Examples and Experimental Examples are merely illustrative of the present disclosure, and the content of the present disclosure is not limited to the following Examples and Experimental Examples.

TABLE 1

|  | RH [%] | $O_2$ partial pressure [%] |
|---|---|---|
| Example 1 | 1 | 0.1 to 1.0 |
| Example 2 | 5 | 0.1 to 1.0 |
| Example 3 | 10 | 0.1 to 1.0 |
| Example 4 | 15 | 0.1 to 1.0 |
| Example 5 | 0 | 0.1 to 1.0 |
| Example 6 | 10 | ≤0.08 |
| Comparative Example 1 | 25 | 0.1 to 1.0 |
| Comparative Example 2 | 10 | 1.01 to 1.5 |

Experimental Example 1

X-ray diffraction was measured for the sacrificial positive electrode materials prepared in Examples 1 to 6 and Comparative Examples 1 to 2 in order to confirm the change according to the partial pressure of oxygen gas in the inert gas in calcination of the raw material mixture, and the fractions of components included in each sacrificial positive electrode material were calculated from the measured X-ray diffraction. At this time, the X-ray diffraction was carried out using Rigaku's X-ray diffraction analyzer, and 1.5406 Å wavelength (Cu Kα radiation, 40 kV, 100 mA) was scanned, and an X-ray diffraction pattern was obtained in the range of 15° to 64° at 2θ and a scanning speed of 5°/sec. Fractions of components contained in the prepared sacrificial positive electrode material were calculated from the obtained X-ray diffraction pattern, and the results are shown in Table 2 and FIGS. 1 and 2.

TABLE 2

| | Calcining Conditions | | Component fraction [mol %] | | | | | |
|---|---|---|---|---|---|---|---|---|
| | RH [%] | $O_2$ partial pressure [%] | $Li_6CoO_4$ | CoO | LiOH | $Li_2CO_3$ | $Li_2O$ | $LiCoO_2$ |
| Example 1 | 1 | 0.1 to 1.0 | 97.8 | 2.2 | — | — | — | — |
| Example 2 | 5 | 0.1 to 1.0 | 98.7 | 1.3 | — | — | — | — |
| Example 3 | 10 | 0.1 to 1.0 | 98.7 | 1.3 | — | — | — | — |
| Example 4 | 15 | 0.1 to 1.0 | 90.5 | 1.6 | 1.6 | 6.4 | — | — |
| Example 5 | 0 | 0.1 to 1.0 | 98.8 | 1.8 | — | — | — | — |
| Example 6 | 10 | ≤0.08% | 100 | — | — | — | — | — |
| Comparative Example 1 | 25 | 0.1 to 1.0 | 85.0 | 2.4 | 2.3 | 8.1 | 0.7 | 1.5 |
| Comparative Example 2 | 10 | 1.05-1.5 | 95.4 | 1.3 | — | — | — | 3.3 |

Examples 1-6 and Comparative Examples 1-2. Preparation of Sacrificial Positive Electrode Material Lithium oxide ($Li_2O$, unimodal distribution, $D_{50}$=10 to 30 μm) and cobalt oxide (CoO) were input into a reactor to have a molar ratio of 3.0 to 3.03:1, and uniformly dry-mixed for about 30 minutes using a mixer. Then, the prepared raw material mixture was put into an electric furnace and calcined for 10 hours at about 700° C. under argon gas (Ar) conditions to obtain lithium cobalt oxide ($Li_6CoO_4$). At this time, the relative humidity (RH) in the electric furnace during calcination and the partial pressure of oxygen gas ($O_2$) contained in argon gas are shown in Table 1 below.

As shown in Table 2, in the sacrificial positive electrode material prepared according to the present disclosure, the relative humidity and partial pressure of oxygen gas in the inert gas were controlled within certain ranges in calcining of the raw material mixture, thus it can be seen that the fraction of lithium cobalt metal oxide represented by Chemical Formula 1 was increased to 90% or more, specifically 97% or more.

Figure 2:
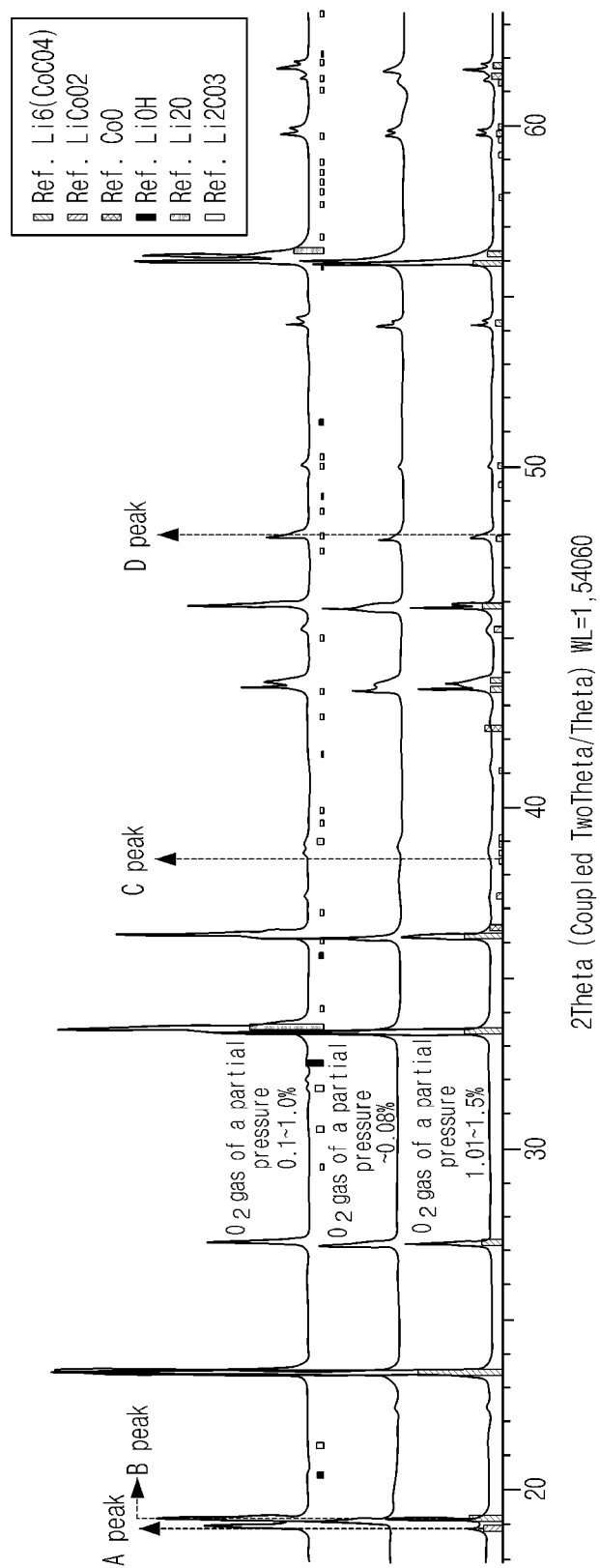
FIG. 2 is a graph showing X-ray diffraction of a sacrificial positive electrode material according to an oxygen partial pressure in calcination of a raw material mixture.

In addition, referring to FIGS. 1 and 2, when a raw material mixture of lithium oxide ($Li_2O$) and cobalt oxide (CoO) is calcinated at about 700° C. under an inert gas atmosphere, lithium cobalt metal oxide ($Li_6CoO_4$) represented by Chemical Formula 1 is produced as a product. In addition, when the relative humidity (RH) during calcination of the raw material mixture is 15% or less and the partial pressure of oxygen gas is 0.1 to 1.0%, the fraction of lithium cobalt metal oxide represented by Chemical Formula 1 increased, a peak (A≈0) showing an impurity in the range of θ=18.9±0.1° was not confirmed, and a peak (C≈0) appearing in the region of θ=38.5±0.3° was confirmed to have insignificant intensity. On the other hand, when the partial pressure of oxygen gas during calcination is 0.2% or more, since the fraction of impurities is high, the intensity of these peaks (A and C) is high, and accordingly, it was confirmed that the ratios (A/B and C/D) of the intensities (B and D) of the peaks representing the lithium cobalt metal oxide represented by Chemical Formula 1 were 0.174 or more and 0.37 or more, respectively. This means that the increased moisture and oxygen gas in the inert gas inhibit the synthesis of the lithium cobalt metal oxide represented by Chemical Formula 1, thereby reducing the yield.

From these results, it can be seen that, during calcination, the relative humidity and the partial pressure of oxygen gas in the inert gas affect the fraction of metal oxide included in the sacrificial positive electrode material.

Experimental Example 2

In order to evaluate the performance of the sacrificial cathode material prepared in the present disclosure, the following experiment was performed.

A) Measurement of Gas Emission

N-methylpyrrolidone solvent was input into a homo mixer, and each of the sacrificial positive electrode materials prepared in Examples 1 to 6 and Comparative Examples 1 to 2, an acetylene black conductive material, a modified silanol binder, and a dispersant were added in a weight ratio of 95:3:1.7:0.3 and then mixed at 3,000 rpm for 60 minutes to prepare a pre-dispersion.

The prepared pre-dispersion was mixed with the positive electrode active material so that the content of the sacrificial positive electrode material was 2 parts by weight based on 100 parts by weight of the positive electrode active material ($LiNi_{0.6}Co_{0.2}Mn_{0.2}O_2$), and the positive electrode active material mixed in an N-methylpyrrolidone solvent, PVdF as a binder and carbon black as a conductive material were put into a homo mixer so as to have a weight ratio of 96:1:3, and then dispersed at 3,000 rpm for 80 minutes to prepare a slurry for a positive electrode. The prepared positive electrode slurry was applied to one surface of an aluminum current collector, dried at 100° C., and rolled to manufacture a positive electrode.

A 2032 type cell was manufactured using the positive electrode and a lithium metal counter electrode. A separator (thickness: about 16 μm) made of a porous polyethylene (PE) film was interposed between the positive electrode and the lithium metal counter electrode, and an electrolyte was injected to manufacture a half-cell type cell.

At this time, as the electrolyte, a mixed solution of ethylene carbonate (EC):ethyl methyl carbonate (EMC)=3:7 (volume ratio), lithium hexafluoro phosphate ($LiPF_6$, 0.7 M), lithium bis(fluorosulfonyl) imide (LiFSI, 0.5M), lithium tetrafluoroborate ($LiBF_4$, 0.2 wt %), vinyl carbonate (VC, 2 wt %), 1,3-propane sultone (PS, 0.5 wt %), and ethylene sulfate (Esa, 1 wt %), was used.

The manufactured cell was charged/discharged once under the condition of 4.5 C/0.3 C to carry out formation. And then the manufactured cell was analyzed the amount and component of gas generated respectively during each charge and discharge which were repeatedly performed 50 times at 45° C. under 0.3 C condition and during storage at 60° C. for 4 weeks. The results are shown in Table 3 below and FIGS. 3 and 4.

TABLE 3

| Units: mL/g | Example | | | | | | Comparative Example | |
|---|---|---|---|---|---|---|---|---|
| | 1 | 2 | 3 | 4 | 5 | 6 | 1 | 2 |
| initial charging/discharging (formation) | 78.1 | 80.7 | 99.6 | 106 | 100.3 | 111 | 119.5 | 82 |

As shown in Table 3 and FIGS. 3 and 4, in the case of the sacrificial positive electrode material prepared according to the present disclosure, the amount of gas generated during charging/discharging was found to be reduced. It can be confirmed that such a tendency occurs when the relative humidity (RH) in the electric furnace and the oxygen gas ($O_2$) in the inert gas in calcination of the raw material mixture satisfy specific ranges as in the present disclosure.

B) Evaluation of Initial Charging/Discharging

A half-cell type cell was manufactured in the same manner as in the measurement of gas emission, except that a mixed solution of ethyl methyl carbonate (EMC):dimethyl carbonate (DMC):diethyl carbonate (DEC)=1:2:1 (volume ratio), lithium hexafluorophosphate ($LiPF_6$, 1.0M) and vinyl carbonate (VC, 2 wt %) was used as the electrolyte.

The initial charging capacity and the irreversible capacity were measured by performing charging/discharging (formation) for each manufactured cell. At this time, the charging/discharging (formation) was carried out under the conditions of 70 mAh/3 mAh, and the results are shown in Table 4 and FIGS. 5 and 6 below.

TABLE 4

| | RH [%] | $O_2$ partial pressure [%] | Initial charging capacity [mAh] |
|---|---|---|---|
| Example 1 | 1 | 0.1 to 1.0 | 810.8 |
| Example 2 | 5 | 0.1 to 1.0 | 802.7 |
| Example 3 | 10 | 0.1 to 1.0 | 792.4 |
| Example 4 | 15 | 0.1 to 1.0 | 749.5 |
| Example 5 | 0 | 0.1 to 1.0 | 788.1 |
| Example 6 | 10 | to 0.08 | 817 |
| Comparative Example 1 | 25 | 0.1 to 1.0 | 723.5 |
| Comparative Example 2 | 10 | 1.01 to 1.5 | 682 |

As shown in Table 4 and FIGS. 5 and 6, it can be seen that the sacrificial positive electrode material prepared according to the present disclosure has an effect of improving the performance of the battery. Specifically, the sacrificial positive electrode material of the examples was found to have a higher initial charge capacity as the relative humidity (RH) in the electric furnace was high and the oxygen gas ($O_2$) in the inert gas had a lower partial pressure when the raw material mixture was calcined. This means that when the relative humidity (RH) in the electric furnace is high when the raw material mixture is calcinated, the initial charging capacity is increased, but the amount of gas generated during charging/discharging is increased.

From these results, the sacrificial positive electrode material prepared according to the present disclosure has an excellent effect of improving the performance of the battery by adjusting the relative humidity (RH) and the partial pressure of the oxygen ($O_2$) gas in the inert gas in calcination of the raw material mixture to specific ranges, and is capable of reducing the generation of gas, in particular, oxygen ($O_2$) gas, generated in the electrode assembly during battery charging, and thus an effect for improving the stability and life of the battery containing the same is excellent.

While the foregoing has been described with reference to preferred embodiments of the present disclosure, it should be understood by those skilled in the art or by those of ordinary skill in the art that various changes and modifications can be made therein without departing from the spirit and scope of the disclosure as set forth in the claims that follow.

Accordingly, the technical scope of the present disclosure should not be limited to the content described in the detailed description of the specification, but should be defined by the claims.

The invention claimed is:

1. A method of preparing a sacrificial positive electrode material, comprising:
    calcining a raw material mixture of lithium oxide ($Li_2O$) and cobalt oxide (CoO) under atmosphere containing an inert gas and oxygen gas, wherein the oxygen gas is at a partial pressure of 1% or less to prepare a lithium cobalt metal oxide represented by the following Chemical Formula (1),
    wherein the atmosphere has a relative humidity (RH) of 0.1% to 15%:

$$Li_xCo_{(1-y)}M_yO_{4-z}A_z \qquad \text{[Chemical Formula 1]}$$

wherein,
    M is at least one selected from the group consisting of Ti, Al, Zn, Zr, Mn and Ni,
    A is an oxygen-substituted halogen,
    x, y and z are $5 \leq x \leq 7$, $0 \leq y \leq 0.4$, and $0 \leq z \leq 0.001$.

2. The method of claim 1, wherein the calcining is performed at a temperature of 500 to 800° C.

3. The method according to claim 1, wherein the lithium oxide ($Li_2O$) and the cobalt oxide (CoO) are in a molar ratio of 2 to 4:1.

4. The method of claim 1, wherein the average particle size ($D_{50}$) of lithium oxide ($Li_2O$) is in a range of 10 μm to 30 μm.

5. The method of claim 1, wherein the sacrificial positive electrode material satisfies one or more of Equations 1 and 2 below, as measured by X-ray diffraction:

$$A/B \leq 0.1 \qquad \text{[Equation 1]}$$

$$C/D \leq 0.35 \qquad \text{[Equation 2]}$$

wherein,
A represents the intensity of the strongest peak among the peaks appearing in the range of $2\theta=18.9\pm0.1°$,
B represents the intensity of the strongest peak among the peaks appearing in the range of $2\theta=19.2\pm0.1°$,
C represents the intensity of the strongest peak among the peaks appearing in the range of $2\theta=38.5\pm0.1°$, and
D represents the intensity of the strongest peak among the peaks appearing in the range of $2\theta=47.9\pm0.1°$.

* * * * *